United States Patent Office  3,528,490
Patented Sept. 15, 1970

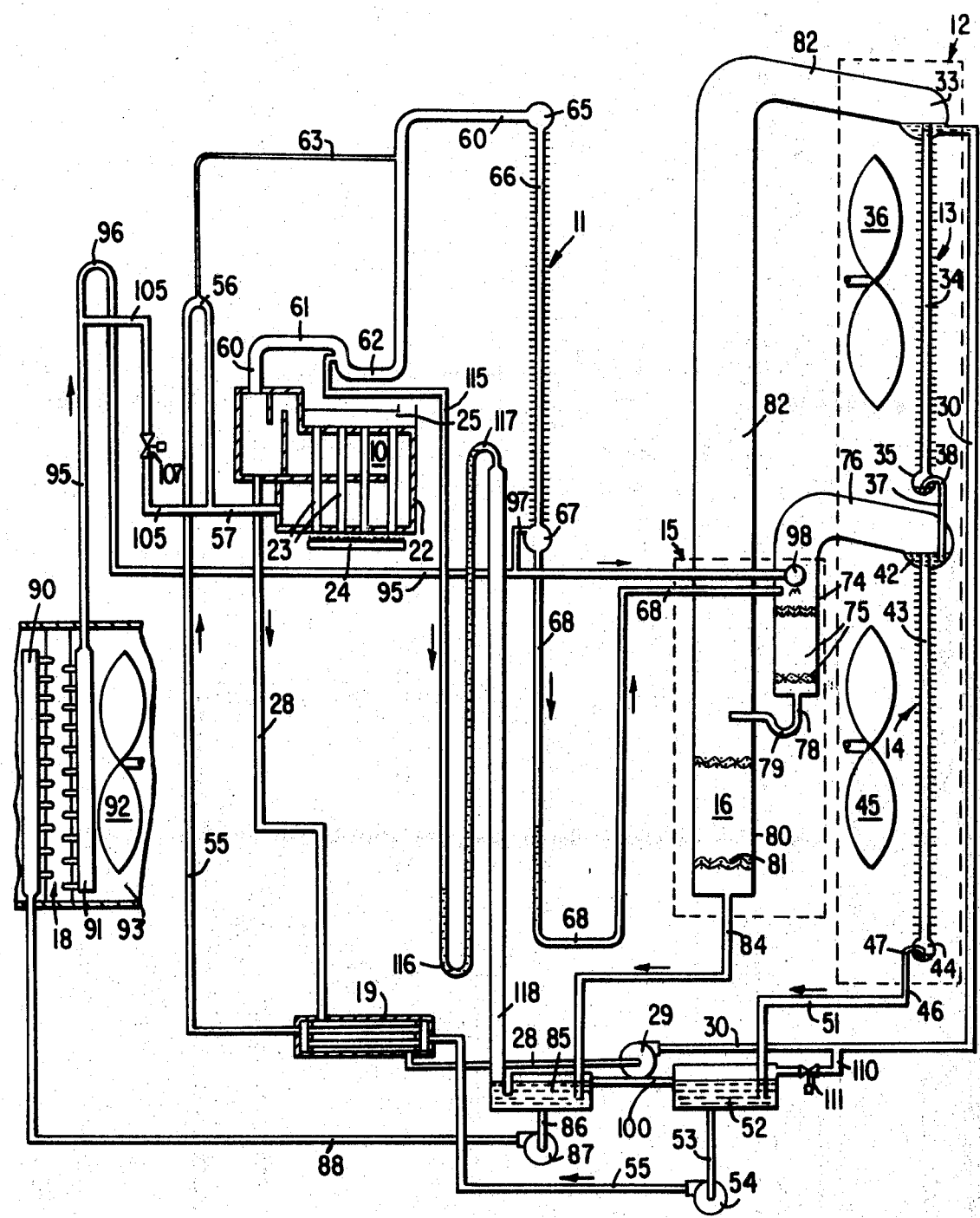

3,528,490
ABSORPTION HEATING AND COOLING SYSTEM
William W. Bell, Jr., Marcellus, N.Y., assignor to Carrier Corporation, Syracuse, N.Y., a corporation of Delaware
Filed Dec. 18, 1968, Ser. No. 784,750
Int. Cl. F25b 15/06, 29/00
U.S. Cl. 165—2       15 Claims

ABSTRACT OF THE DISCLOSURE

A heating and cooling system which in the cooling mode employs an absorption refrigeration cycle to provide cooling and in the heating mode employs a mixture of absorbent solution and refrigerant which is heated in the generator and circulated to provide heating. The cooling mode employs a two-stage adiabatic evaporator in combination with a counterflow, two-stage air-cooled absorber. The system employs a plurality of loops and traps to automatically switch from heating to cooling and back to heating by raising and lowering the level of fluid at a location in the system associated with the generator. Siphoning of liquid from the generator is prevented by either venting the various loops or by enlarging the diameter of a passage in the loop, and a weir is provided to maintain a minimum level of liquid in the generator in both the heating and cooling modes as well as upon shutdown of the system.

BACKGROUND OF THE INVENTION

Various systems for providing heating from an absorption machine have been previously proposed. Generally, such systems have depended on a condensation process taking place at some location in the system in order to provide heating. Some means of changing from the cooling to the heating mode of operation has been provided, such as blowing a seal water loop with generator pressure. However, prior systems for providing heating by the condensation process had numerous disadvantages, such as the need for purging the system in order to obtain satisfactory condensation and the need for high temperatures in the heating mode which may lead to the production of non-condensible gases and acceleration of corrosion during heating operation.

These problems have been largely overcome by a system which forms the subject matter of Leonard application, Ser. No. 784,724 filed concurrently herewith. In that system, absorbent solution and refrigerant are mixed together to form an antifreeze liquid, which is heated below its boiling point in the generator and circulated through a heat exchanger to heat a desired location.

Various arrangements may be visualized for converting a system of the general type described from the cooling mode to the heating mode of operation. From a practical standpoint however, it is necessary to achieve the conversion with a minimum of valves and passages and to make the control system simple in order for the system to be economical and easily serviceable for moderate size heating and cooling requirements, such as homes and small buildings. Furthermore, it is necessary to provide an exceptionally reliable heating system so that malfunction of the system still permits heating operation. Also, it is necessary to prevent interaction between the passages that would result in siphoning liquid out of the generator. It is a principal feature of this invention to provide an arrangement of heating and cooling passages which permits simple and reliable changeover from the heating to the cooling mode of operation and back again at relatively low cost and avoiding the use of a large number of valves which might be subject to malfunction.

SUMMARY OF THE INVENTION

In accordance with this invention, there is provided a heating passage which is connected at a location in the system associated with the generator, at which level of liquid rises when heating mode operation is desired. The heating mode passage includes a trap having sufficient vertical height to balance the pressure difference between the generator and the absorber in cooling mode operation with a column of liquid remaining in the trap. The level of liquid in the generator is raised when heating mode operation is desired by opening a valve which diverts refrigerant from passing to the evaporator and circuits it into the generator. The diverted refrigerant mixes with absorbent solution in the generator and increases the volume of liquid supplied to the generator to raise the level of liquid at the location to which the heating passage is connected. Raising the level at that location automatically initiates passage of heated mixture through the heating passage to a heat exchanger. When it is desired to switch from heating to cooling operation, the level of liquid at the location to which the heating passage is connected is lowered by passing liquid to the evaporator which exposes the heating passage to vapor and discontinues passage of fluid therethrough.

The heating passage is further provided with an enlarged diameter portion in its downstream leg so as to prevent siphoning of liquid from the upstream leg on termination of the heating cycle. Likewise, a weak solution passage is provided with a loop extending above the level at the location to which the heating passage is connected and having a vent to a vapor space in order to prevent siphoning of the generator through the weak solution passage during heating mode operation.

BRIEF DESCRIPTION OF THE DRAWING

The drawing is a schematic flow diagram, partially in cross section, of a heating and cooling system having heating and cooling passages in accordance with this invention showing certain liquid levels in the cooling mode of operation.

DESCRIPTION OF THE PREFERRED EMBODIMENT

This invention will be described with respect to a preferred embodiment wherein a two-stage adiabatic refrigerant evaporator and a two-stage air-cooled absorber are employed. However, this invention may be employed in systems having any number of either adiabatic or non-adiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong" solution and a dilute solution of lithium bromide which is weak in absorbing power will be referred to as "weak" solution. "Refrigerant" as used herein includes pure water, which may be referred to as "concentrated refrigerant" and refrigerant water having lithium bromide therein which may be referred to as "dilute refrigerant." A heat transfer promoting additive, such as 2-ethyl-n-hexanol, may be added to the absorbent solution.

Referring to the drawing, the system comprises a generator 10, a condenser 11, an absorber 12 having a low pressure tage 13 and a high pressure stage 14, an adiabatic evaporator 15 having a low temperature stage 16 and a high temeprature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger.

Generator 10 comprises a shell 22 having a plurality of fire tubes 23 extending therethrough. Fuel burner 24 discharges hot gas through fire tubes 23 to flue gas collector 25. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low pressure vapor header 33 disposed at the top of low pressure absorber stage 13.

Low pressure absorber stage 13 comprises a plurality of vertically disposed finned absorber heat exchange tubes 34 connected at their upper ends by a low pressure vapor header 33 and at their lower ends by a low pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low pressure liquid header 35 is of intermediate concentration. The intermediate solution passes through siphon tube 37 having an upwardly arched portion 38 into high pressure vapor header 42 of high pressure absorber stage 14.

High pressure absorber stage 14 comprises a plurality of finned vertical absorber heat exchange tubes 43 joined at their upper ends by high pressure vapor header 42 and at their lower ends by high pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high temperature absorber stage 14 to ambient air passed over the exterior surfaces of absorber tubes 43 by fan 45.

Absorbent solution passing downwardly through absorber tubes 43 is further diluted by the absorption of refrigerant vapor therein so that the absorbent solution collected in high pressure liquid header 44 is weak in absorbing power. The weak solution passes from low pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high temperature evaporator stage 17 of adiabatic refrigerant evaporator 15.

High temperature evaporator stage 17 comprises a shell 74 having a suitable packing material 75 therein. A vapor passage 76 extends between high temperature evaporator stage 17 and vapor header 42 of high pressure absorber stage 14. A small quantity of refrigerant is evaporated from refrigerant passing through evaporator stage 17, thereby flash-cooling the remaining refrigerant. The cooled refrigerant passes from high temperature evaporator stage 17 to low temperature evaporator stage 16 through refrigerant passage 78 having a downwardly extending trap 79.

Low temperature evaporator stage 16 comprises a shell 80 having packing material 81 therein and a refrigerant vapor passage 82 communicating with vapor header 33 of low pressure absorber 13. As in the preceding stage, a small quantity of refrigerant is evaporated in low temperature evaporator stage 16 which results in flash-cooling the remainder of refrigerant passing therethrough. In all, only about one percent of the total refrigerant flowing through adiabatic evaporator 15 need be evaporated to satisfactorily flash-cool the remaining ninety-nine percent. A conventional single or multi-stage evaporator having a heat absorbing heat exchanger 18 included therein may be employed, if desired.

The cold refrigerant then passes from low temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 95 having an upwardly extending loop 96 and a restricted spray nozzle 98 back to high temperature evaporator stage 17 of adiabatic evaporator 15 for recooling of the refrigerant. Bleed passage 97 is provided to pass a small quantity of the returning liquid refrigerant into liquid condensate header 67.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as explained in Leonard application Ser. No. 784,724.

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52.

In accordance with this invention, heating passage 115 is connected to a location in passage 60 associated with generator 10 which contains vapor in the cooling mode and contains liquid in the heating mode. Trap 116 has a vertical height to the top of loop 117 sufficient to balance the pressure difference between generator 10 and absorber 16 when filled with water or solution during the cooling mode. The maximum elevation of loop 117 is below the location in passage 60 to which passage 115 is connected. The enlarged diameter of the downstream leg 118 of loop 117 forms a siphon breaker to prevent heating passage 115 from siphoning liquid from the generator.

Heating passage 105 is connected to the upstream leg of loop 96 in refrigerant passage 95 at an elevation above the location to which heating passage 115 is connected and above the level of loop 61 which communicates heating passage 115 with generator 10. Passage 105 is also above the minimum level of solution which it is desired to maintain in generator 10.

When the system is in the cooling mode of operation, mode control valves 107 and 111 are closed and the liquid levels are approximately as shown in the drawing. Loop 116 is filled with sufficient liquid to balance the pressure difference between generator 10 and refrigerant sump 85 to prevent passage of vapor therebetween.

To switch from the cooling mode of operation to the heating mode, control valves 107 and 111 are opened. Operation of pumps 54 and 29, and fans 36 and 45, is discontinued. Opening of valve 107 causes the liquid refrigerant passing through passage 95 from heat exchanger 18 to be diverted into passage 105 because passage 105 and connecting passage 57 is below the top of loop 96 which is above the top of loop 61. Generator 10 and loops 61 and 62 are then flooded with a mixture of refrigerant and absorbent solution by pump 87. The liquid level in passage 60 is below the junction of vent line 63 and below the top of loop 96 but above the junction of passage 115 and loop 117 with passage 60. Substantially all of the refrigerant and absorbent solution in the system is thereby mixed together to form an antifreeze liquid when the system is in the heating mode. The preferred concentration is between about fifty percent and about thirty percent lithium bromide.

The passage of refrigerant into the generator raises the level of liquid in the generator above the top of generator and above the top of trap 62. Raising the level of liquid at the location to which heating passage 115 is connected automatically initiates flow of heated liquid from the generator through passage 115 including trap 116 and loop 117 into sump 85. A major portion of the heated solution (90%) passes upwardly through loop 61 into heating passage 115. The level of the heated solution is above the level of upwardly extending loop 117 and it will flow by gravity through passage 115 through downwardly extending leg 118 into refrigerant sump 85. The heated solution passes from refrigerant sump 85 through passage 86 and is pumped by pump 87 via passage 88 through the heat exchanger 18. Heat exchanger 18 in the heating mode operation operates as a heat rejecting exchanger, thereby warming air passing through duct 93 and cooling the solution. The cooled solution passes from heat exchanger 18 through passages 95, 105 and 57 back to generator 10 for reheating. A minor portion (10%) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

Loop 56 in weak solution passage 55 is disposed below the level of loop 96 and above the level of heating passage 105 and is vented through passage 63 to a vapor space in passage 60. Loop 56 prevents passage of heated liquid from generator 10 backwardly through weak solution passage 55, because it is above the maximum level of liquid in generator 10 and passage 60 under all conditions of operation. The vent 63 prevents loop 56 from acting as a siphon under all conditions of operation of the system.

Generator 10 is internally provided with a weir 131 which creates an internal loop 130 within shell 22. Weir 131 provides a minimum level of solution in generator 10 under all conditions. Consequently, loop 130 and loop 61 together with heating passage 115 form a generator effluent passage in the heating mode. It will be seen that in place of weir 131, a suitable loop externally arranged in the generator effluent passage for both heating and cooling mode operation could be employed.

When it is desired to terminate heating and return to the cooling mode of operation, mode control valves 107 and 111 are closed. Pumps 54 and 29, and fans 36 and 45 are again energized. Closing of valve 107 terminates direct flow of liquid from heat exchanger 18 to generator 10. Instead, solution is pumped from heat exchanger 18, through upwardly extending loop 96 and passage 95, and serially through high temperature evaporator 17 and low temperature evaporator 16 of adiabatic evaporator 15. The solution in generator 10 is heated to the boiling temperature to concentrate the solution. The level of solution in the generator drops so that vapor passage 60 is free of liquid and contains vapor. Loop 116 is sealed with liquid and prevents vapor from passing therethrough.

The volume of strong absorbent solution passing to sump 52 will decrease as refrigerant is boiled from it in the generator, and the level of solution in sump 52 will tend to drop. Conversely, the quantity of refrigerant passing through evaporator 15 will increase due to the refrigerant added to the refrigerant circuit from condenser 11, and the level of refrigerant in sump 85 will tend to rise. When the level of refrigerant in sump 85 tends to exceed the level of absorbent solution in sump 52, diluted refrigerant will flow through refrigerant reconcentration and vapor pressure control passage 100 into absorbent sump 52 to balance the liquid levels in the two sumps. At absorber ambient temperature above design conditions, diluted refrigerant will continue to be bled from sump 85 into sump 52 until the refrigerant has been substantially concentrated and the absorbent solution has been concentrated to the desired full-load design operating concentration.

If the temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable vapor pressure effect which just balances refrigeration load against absorber capacity.

By means of the arrangement illustrated and described herein, a simple and reliable heating mode is provided which is initiated by simply raising the level of solution in the generator effluent passage so that hot liquid passes through heating passage 115. Conversely, changeover from heating to cooling mode operation is simply achieved by closing valve 107, thereby reducing the flow of liquid to the generator and dropping the level in the generator effluent passage below the junction of passage 115 with passage 60. In the event of failure of valves 107 or 111, they will assume a normally open position which will permit heating cycle operation. This arrangement has the advantage of providing simple and reliable changeover between heating and cooling mode operation at relatively small cost.

While the preferred embodiment of this invention has been illustrated and described, it will be appreciated that the invention may be otherwise embodied within the scope of the following claims.

I claim:
1. A heating and cooling system having a cooling mode of operation and a heating mode of operation;
  (A) said system in the cooling mode of operation comprising a generator for concentrating weak absorbent solution by boiling the weak solution and vaporizing refrigerant therefrom, a condenser for condensing refrigerant vaporized in the generator, an evaporator for evaporating refrigerant condensed in the condenser to provide cooling, and an absorber for absorbing refrigerant vapor formed in the evaporator into absorbent solution concentrated in the generator, said system including weak solution pas- sage means for passing weak absorbent solution from the absorber to the generator, and strong solution passage means for passing strong absorbent solution from the generator to the absorber;

(B) said system in the heating mode of operation comprising heating passage means for passing liquid to the generator for heating therein, passing the liquid through a heat exchanger in heat exchange relation with a heating load, and returning the liquid to the generator for reheating therein;

wherein the improvement comprises:

(C) said heating passage means including an effluent passage communicating with said generator and having an opening disposed at a location containing liquid when said system is in the heating mode of operation and containing gas when said system is in the cooling mode of operation, whereby said passage carries heated liquid from said generator for heating said heating load when the level of liquid at said location rises to a predetermined level; and (D) means for raising the level of liquid at said location to said predetermined level when heating mode operation of said system is desired.

2. A heating and cooling system as defined in claim 1 wherein said effluent passage includes a trap therein, said trap having a maximum elevation below said predetermined level in said location and having a height sufficient to balance the pressure difference between said generator and said evaporator when filled with a liquid in the cooling mode of operation, whereby hot liquid from said generator will automatically flow through said effluent passage to said heat exchanger upon a rise in the level of liquid in said location to said predetermined level, and said trap will prevent vapor from passing from said generator through the trap in said effluent passage upon a drop in the level of liquid in said location below said predetermined level.

3. A heating and cooling system as defined in claim 1 wherein said effluent passage includes a trap therein, said trap having a maximum elevation below said predetermined level in said location and having a height sufficient to balance the pressure difference between said generator and said evaporator when filled with a liquid in the cooling mode of operation, whereby hot liquid from said generator will automatically flow through said effluent passage to said heat exchanger upon a rise in the level of liquid in said location to said predetermined level; and said trap having an upstream leg and a downstream leg in the direction of liquid flow therethrough, said downstream leg having a greater cross-sectional area than said upstream leg to prevent siphoning of liquid from the upstream leg thereof.

4. A heating and cooling system as defined in claim 1 wherein said means for raising the level of liquid in said location comprises means for increasing the volume of liquid supplied to said generator when heating mode operation is desired.

5. A heating and cooling system as defined in claim 1 wherein:

(A) said cooling passage means including passage means for passing cooled liquid refrigerant from said evaporator in heat exchange wtih a refrigeration load and back to said evaporator during cooling mode operation of said system; and (B) said heating passage means including passage means for diverting liquid passing through said cooling passage means to said generator during heating mode operation of said system.

6. A heating and cooling system as defined in claim 1 including:

(A) said cooling passage means comprising a passage for passing refrigerant to said evaporator through a loop in the cooling mode operation of said system;

(B) said heating passage means comprising a passage extending from said cooling passage to said generator, said passage being connected to said cooling passage at a point below the top of said loop; and (C) valve means in one of said passages for diverting passage of liquid from said cooling passage to said heating passage when heating mode operation is desired.

7. A heating system as defined in claim 1 wherein said effluent passage includes means for maintaining a minimum liquid level in said generator during the cooling mode of operation of said system.

8. A heating system as defined in claim 1 wherein said effluent passage means includes means for maintaining a minimum liquid level in said generator during the cooling operation of said system, said last means comprising a weir disposed internally in said generator and governing discharge of liquid therefrom in both the heating mode and the cooling mode of operation of said system.

9. A heating and cooling system as defined in claim 1 wherein said effluent passage includes a trap therein, said trap having a miximum elevation below said predetermined level in said location and having a height sufficient to balance the pressure difference between said generator and said evaporator when filled with a liquid in the cooling mode of operation, whereby hot liquid from said generator will automatically flow through said effluent passage to said heat exchanger upon a rise in the level of liquid in said location to said predetermined level, and said trap will prevent vapor from passing from said generator through the trap in said effluent passage upon a drop in the level of liquid in said location below said predetermined level; said system including means associated with said effluent passage for preventing siphoning of liquid from said trap through said effluent passage.

10. A heating and cooling system as defined in claim 1 wherein said weak solution passage is more restricted than said generator effluent passage so that at least a major portion of liquid heated in said generator passes from said generator through said effluent passage when said system is operating in the heating mode.

11. A heating and cooling system as defined in claim 1 wherein said weak solution passage means includes a weak solution loop, said weak solution loop having a vertical elevation at least as high as the minimum level of liquid desired at said location for maintaining said minimum level of liquid at said location when said system is inoperative and when said system is operating in the heating mode.

12. A heating and cooling system as defined in claim 1 wherein said weak solution passage means includes a weak solution loop, said weak solution loop having a vertical elevation at least as high as the minimum level of liquid desired in said generator, for maintaining said minimum level of liquid in said generator; and means associated with said weak solution passage for preventing siphoning of liquid from said generator through said weak solution passage.

13. A method of operating a heating and cooling system, said system having an absorption refrigeration cooling mode of operation comprising a generator for concentrating weak absorbent solution by boiling the weak solution and vaporizing refrigerant therefrom, a condenser for condensing refrigerant vaporized in the generator, an evaporator for evaporating refrigerant condensed in the condenser to provide cooling, and an absorber for absorbing refrigerant vaporized in the evaporator into absorbent solution concentrated in the generator; said system having a heating mode of operation comprising heating passage means having an opening disposed in a location communicating with the generator for passing heated liquid from the generator through a heat exchanger in heat exchange relation with a heating load; wherein the improvement comprises raising the level of heated liquid at said location in the system to cause passage of the heated liquid through said heating passage means when operating said system in the heating mode; and lowering the level of liquid at said location when cooling mode operation of said system is desired.

14. A method of operating a heating and cooling system as defined in claim 13 wherein the step of raising the level of liquid at said location includes passing liquid refrigerant to the generator for heating therein.

15. A method of operating a heating and cooling system as defined in claim 13 wherein said cooling mode of operation includes evaporating a portion of refrigerant in said evaporator to cool the remaining liquid refrigerant, passing cooled liquid refrigerant through a heat exchanger to cool a desired location and returning the liquid refrigerant to the evaporator for recooling; and said step of raising the level of heated liquid at said location comprises diverting liquid refrigerant from returning to the evaporator and passing it to the generator for heating therein.

References Cited

UNITED STATES PATENTS 3,153,441    10/1964    Pippert et al. _____ 165—62 X

WILLIAM E. WAYNER, Primary Examiner

U.S. Cl. X.R.

165—62